(12) United States Patent
Lenglachner

(10) Patent No.: US 11,554,504 B2
(45) Date of Patent: Jan. 17, 2023

(54) CHANGE-OVER COUPLING

(71) Applicant: FACC AG, Ried im Innkreis (AT)

(72) Inventor: Wolfgang Lenglachner, Braunau am Inn (AT)

(73) Assignee: FACC AG, Ried im Innkreis (AT)

( * ) Notice: Subject to any disclaimer, the term of this patent is extended or adjusted under 35 U.S.C. 154(b) by 0 days.

(21) Appl. No.: 17/595,132

(22) PCT Filed: May 8, 2020

(86) PCT No.: PCT/AT2020/060185
§ 371 (c)(1),
(2) Date: Nov. 9, 2021

(87) PCT Pub. No.: WO2020/223752
PCT Pub. Date: Nov. 12, 2020

(65) Prior Publication Data
US 2022/0203559 A1    Jun. 30, 2022

(30) Foreign Application Priority Data

May 9, 2019    (AT) .............................. A 50419/2019

(51) Int. Cl.
*B25J 9/08*    (2006.01)
*B25J 15/04*    (2006.01)

(52) U.S. Cl.
CPC ................................ *B25J 15/0408* (2013.01)

(58) Field of Classification Search
CPC ................ B25J 15/0408; B25J 15/0019; B25J 15/0023; B25J 15/009
(Continued)

(56) References Cited

U.S. PATENT DOCUMENTS 4,363,135 A    12/1982  Moon
4,636,135 A *  1/1987  Bancon ................ B25J 15/0491
483/901
(Continued)

FOREIGN PATENT DOCUMENTS

CN    106025626 A    10/2016
CN    107097247 A     8/2017
(Continued)

OTHER PUBLICATIONS

ISA European Patent Office, International Search Report Issued in Application No. PCT/AT2020/060185, dated Jul. 22, 2020, WIPO, 2 pages.
(Continued)

*Primary Examiner* — Paul T Chin
(74) *Attorney, Agent, or Firm* — McCoy Russell LLP

(57) ABSTRACT

The invention relates to a change-over coupling, change-over device and checking or processing system, comprising: a clamping element for bracing with a corresponding clamping element on the change-over adapter, at least one electrical and/or optical plug connection element for connecting to at least one corresponding electrical and/or optical plug connection element on the change-over adapter, and a fluid coupling element for connecting to a corresponding fluid coupling element on the change-over adapter. In at least one example, the fluid coupling element protrudes further in the direction of the connection with the change-over adapter than the electrical and/or optical plug connection element.

15 Claims, 12 Drawing Sheets

(58) Field of Classification Search
USPC ..................................... 294/213; 74/490.02
See application file for complete search history.

(56) References Cited

U.S. PATENT DOCUMENTS

| | | | | |
|---|---|---|---|---|
| 4,917,619 | A * | 4/1990 | Nishiwaki | B23K 9/323 |
| | | | | 901/50 |
| 5,069,524 | A * | 12/1991 | Watanabe | H01R 13/625 |
| | | | | 385/59 |
| 5,243,264 | A * | 9/1993 | Takada | B25J 15/04 |
| | | | | 403/328 |
| 5,782,571 | A | 7/1998 | Hufford et al. | |
| 6,784,612 | B2 * | 8/2004 | Park | H01L 51/525 |
| | | | | 313/504 |
| 10,780,575 | B2 * | 9/2020 | Reese | B25J 19/0029 |
| 2008/0273844 | A1 * | 11/2008 | Kewitsch | G02B 6/447 |
| | | | | 385/101 |
| 2009/0143207 | A1 | 6/2009 | Wampler et al. | |
| 2016/0059424 | A1 * | 3/2016 | Zachary | B25J 15/0416 |
| | | | | 483/1 |
| 2016/0089794 | A1 * | 3/2016 | Niu | F16L 3/015 |
| | | | | 901/27 |

FOREIGN PATENT DOCUMENTS

| | | |
|---|---|---|
| DE | 112015003807 T5 | 10/2017 |
| EP | 0120275 A1 | 10/1984 |
| EP | 1590134 B1 | 10/2010 |
| EP | 2716418 A1 | 4/2014 |
| JP | H0502887 U | 1/1993 |
| JP | H0639763 A | 2/1994 |
| JP | 2016190282 A | 11/2016 |
| WO | 2004069492 A2 | 8/2004 |
| WO | 2015074710 A1 | 5/2015 |

OTHER PUBLICATIONS

State Intellectual Property Office of the People's Republic of China, Office Action and Search Report Issued in Application No. 202080007484.6, dated Dec. 24, 2021, 15 pages. (Submitted with Partial Translation).

* cited by examiner

CHANGE-OVER COUPLING

CROSS REFERENCE TO RELATED APPLICATIONS

The present application is a U.S. National Phase of International Application No. PCT/AT2020/060185 entitled "CHANGE-OVER COUPLING," and filed on May 8, 2020. International Application No. PCT/AT2020/060185 claims priority to Austrian Patent Application No. A 50419/2019 filed on May 9, 2019. The entire contents of each of the above-listed applications are hereby incorporated by reference for all purposes.

TECHNICAL FIELD

The invention relates to a change-over coupling for connecting a manipulation element, in particular a robot arm, to a change-over adapter, in particular for the non-destructive testing of a component, having:

a clamping element for bracing with a corresponding clamping element on the change-over adapter, at least one electrical and/or optical plug connection element for connection to at least one corresponding electrical and/or optical plug connection element on the change-over adapter.

BACKGROUND AND SUMMARY

The invention also relates to a change-over device and a testing or processing system having such a change-over coupling.

With such change-over couplings, different connections are usually needed for connection to corresponding connections on the change-over adapter, such as plug connections with high-voltage and/or high-current contacts, high-frequency contacts, high-pin-count miniature plug connections (160 pins), and/or plug connections for optical waveguides.

EP 1 590 134 discloses a change-over coupling of the type in question, which can be locked to a change-over adapter. In the locked state, media and communications lines assigned to one another of the change-over coupling and of the change-over adapter, for example for compressed air, sensor signals, welding current or coolant, are connected to one another. It is however disadvantageous that the electrical or optical plug connection elements must be aligned precisely with each other when the change-over coupling and the change-over adapter are connected, to prevent damage to the sensitive electrical or optical plug connection elements.

WO 2015/074710 discloses a different type of depositing station, in which a tool-side receiving plate and a robot-side receiving plate can be deposited.

DE 11 2015 003 807 T5 describes a master unit for fastening to a robot arm and a tool unit for fastening to a robot tool.

US 2016/059424 A1 discloses a master element and a tool element.

The object of the present invention consists in moderating or overcoming at least some disadvantages of the prior art. The invention is aimed in particular at protecting the electrical or optical plug connection elements when the change-over adapter is attached.

This object is achieved by a change-over coupling, a change-over device, and a testing or processing system as described herein.

The invention therefore provides a liquid-coupling element, in particular a water-coupling element, for connection to a corresponding liquid-coupling element on the change-over adapter, wherein the liquid coupling element protrudes further towards the connection to the change-over adapter (i.e. in the longitudinal direction or axial direction of the change-over coupling) than the electrical and/or optical plug connection element, such that the electrical and/or optical plug connection element and the corresponding electrical and/or optical plug connection element on the change-over adapter are aligned with one another before they meet as a result of the connection of the liquid-coupling element to the corresponding liquid-coupling element on the change-over adapter.

The liquid-coupling element of the change-over coupling is thus connected to the corresponding liquid-coupling element on the change-over adapter when the change-over adapter is attached to the change-over coupling, before the electrical or optical plug connection elements are brought into engagement with the corresponding electrical or optical plug connection elements on the change-over adapter. As a result, the corresponding electrical or optical plug connection elements are aligned with one another, i.e. are arranged in the intended rotary position to one another, relative to the longitudinal axis of the change-over coupling, before the change-over adapter is coupled to the change-over coupling. This design has the advantage that damage to the sensitive electrical or optical plug connection elements can reliably be avoided. This functions for both a manual and an automated change-over process. The coupling of the change-over adapter to the change-over coupling is carried out by a person in a manual change-over process and automatically by a robot in an automated change-over process. There is the further advantage that the ingress of liquids and gases into the liquid-coupling element from a testing or processing environment of the change-over coupling is impeded thanks to the self-sealing function of the liquid-coupling element which protrudes further towards the connection to the change-over adapter. This inhibits or prevents contamination of the liquid, in particular the water, in the liquid-coupling element, in particular water-coupling element, and the associated liquid lines, in particular water lines, of the change-over coupling and of the change-over adapter.

According to a preferred embodiment, a change-over process has the following steps:

removing a used change-over adapter from the change-over coupling;

dabbing and/or vacuuming the liquid-coupling element of the change-over coupling and the liquid-coupling element of a change-over adapter to be connected, to avoid introducing liquid into the change-over adapter and/or change-over coupling;

aligning the liquid-coupling element of the change-over coupling with the corresponding liquid-coupling element on the change-over adapter to be attached;

connecting the liquid-coupling element of the change-over coupling to the corresponding liquid-coupling element on the change-over adapter to be attached; and bringing the electrical or optical plug connection elements into engagement with the corresponding electrical or optical plug connection elements on the change-over adapter to be attached.

Entry of liquid during coupling or decoupling is reliably prevented by the liquid-coupling elements. Contamination of the electrical or optical plug connection elements by any droplet formation on the contact faces of the liquid-coupling element is prevented by countersinking the contact face of the liquid-coupling element of the change-over coupling or of the change-over adapter, or arranging same at the front.

The change-over coupling preferably comprises a main body which comprises, on the end face facing the change-over adapter, a main connection face, which extends preferably substantially perpendicular to the longitudinal axis of the change-over coupling and bears against a corresponding main connection face of the change-over adapter when in the connected state. The electrical and/or optical plug connection elements protrude less far in the direction of the longitudinal axis of the change-over coupling than the liquid-coupling element, and therefore, in the intended orientation, the corresponding electrical and/or optical plug connection elements are aligned with one another when the corresponding main connection faces of the change-over coupling and of the change-over adapter come into contact with one another.

For the purposes of the present disclosure, the location and direction information relates to the longitudinal axis of the change-over coupling, which coincides with the direction of the intended connection of the change-over coupling and the change-over adapter. "Axial" relates to the direction of the longitudinal axis, and "radial" relates to the direction normal to the longitudinal axis of the change-over coupling.

According to a preferred embodiment, the change-over coupling comprises an anti-rotation element for connection to a corresponding anti-rotation element on the change-over adapter, the anti-rotation element preferably being provided as a connection peg, which tapers towards the connection to the change-over adapter, and the corresponding anti-rotation element on the change-over adapter being provided as a peg receptacle. Because the connection between the corresponding liquid-coupling elements likewise has an anti-rotation effect, the anti-rotation element can advantageously be made smaller than in change-over couplings having liquid-coupling elements without torque absorption. A further advantage of the anti-rotation elements is that the change-over coupling can be aligned even more precisely with the change-over adapter thereby.

It is particularly preferred if the liquid-coupling element of the change-over coupling comprises a larger radial distance from the clamping element than the anti-rotation element. Thanks to this arrangement, the liquid-coupling element absorbs a greater torque than the anti-rotation element when the change-over adapter is twisted relative to the change-over coupling, which allows smaller dimensioning of the anti-rotation element.

To protect the at least one electrical and/or optical plug connection element and the liquid-coupling element from external influences, it is favourable if the change-over coupling comprises a seal ring for sealing connection to the change-over adapter, the seal ring preferably comprising a V-shaped cross-section. Owing to the V-shaped cross-section, liquid from the environment which collects on the outside of the change-over coupling can drop off, and therefore the electrical and/or optical plug connection element and the liquid-coupling element are protected from the liquid collecting on the outside of the change-over coupling.

According to a preferred embodiment, the seal ring is arranged on a (circumferential) outer edge of a preferably cylindrical main body of the change-over coupling.

According to a preferred embodiment, the electrical and/or optical plug connection element and the liquid-coupling element are each arranged inside the seal ring, as seen in the radial direction. In the connected state, the seal ring extends on the mutually meeting end faces of the change-over coupling and the change-over adapter, and the corresponding electrical and/or optical plug connection elements and the liquid connection are arranged in a protected manner inside the seal ring.

Particularly preferably, the main body comprises at least one first cut-out for the detachable arrangement of the electrical and/or optical plug connection element and/or at least one second cut-out for the detachable arrangement of the liquid-coupling element. During use, the electrical and/or optical plug connection elements are arranged inside the first cut-out, and the liquid-coupling element is arranged inside the second cut-out, and all the above are connected to the associated line of the manipulation element.

According to a preferred embodiment, the change-over coupling comprises a coupling element for air, in particular compressed air, for connection to a corresponding coupling element for air, in particular compressed air, on the change-over adapter. The compressed air can be used by a tool mounted on the change-over adapter, for the expedient use of said tool. During use, the compressed air is in particular used for one of: pneumatic lifting cylinder, blow-off device, sealing air or pneumatic collision protection.

According to a preferred embodiment, the at least one electrical plug connection element is electrically insulated from the change-over coupling. Particularly preferably, the at least one electrical plug connection element is earthed individually. This has an effect in particular on the electromagnetic compatibility of adjacent electrical components. This is important specifically for high-frequency applications.

To reduce a loading force on the change-over coupling, it is favourable if the at least one electrical plug connection element is radially sprung. The loading force on the change-over coupling thus remains independent of the type and number of electrical plug connection elements.

According to a preferred embodiment, at least one electrical plug connection element of the change-over coupling comprises high-voltage contacts or high-current contacts. In this connection, high voltage means a voltage of at least 680 volts direct current, and high current means an electrical current of at least 25 amperes.

It is also favourable if at least one electrical plug connection element of the change-over coupling comprises high-frequency contacts. In this connection, high frequency means a frequency of 100 kHz to 9 GHz. The high-frequency contacts are used for example in a tool mounted on the change-over adapter for the non-destructive testing of a component by means of ultrasound, in particular ultrasound with beam steering. Beam steering is the targeted emission of ultrasonic impulses from a probe mounted on the tool.

According to a preferred embodiment, at least one electrical plug connection element of the change-over coupling has a high pin count, a high pin count meaning a number of at least 160 pins. High-pin-count plug connection elements are used for example for signal transmission in lines for emitter array testing heads (phased array testing heads) for testing with phased array ultrasonics. Signals from a tool mounted on the change-over adapter can thus be transmitted via lines and via the electrical plug connection element to an evaluation unit of phased array testing electronics.

According to a preferred embodiment, at least one electrical plug connection element of the change-over coupling comprises contacts for transmitting a supply voltage from the manipulation element to the change-over adapter. The contacts for transmitting the supply voltage are for example used for the non-destructive testing of a component using a tool which is mounted on the change-over adapter and is supplied by a voltage source, to connect electrical lines of the manipulation element and of the tool via the change-over coupling and the change-over adapter.

According to a preferred embodiment, at least one electrical plug connection element of the change-over coupling comprises contacts for data transmission, in particular for transmitting a tool identifier ("ToolID") and/or analogue and/or digital sensor data, from the change-over adapter to the manipulation element. In this case, ToolID is the unique identifier of a tool, for example by means of a unique number, and analogue and/or digital sensor information is information from an analogue and/or digital sensor of a tool mounted on the change-over adapter.

According to a preferred embodiment, at least one electrical plug connection element of the change-over coupling comprises contacts for transferring ground points. High-frequency influences can be minimised or eliminated thereby, if different galvanically isolated earth points are necessary.

Preferably, at least one optical plug connection element of the change-over coupling comprises an optical waveguide. Optical waveguides are used to transmit light. The optical waveguide of the optical plug connection element is used for lossless transmissions (streams) of digital sensor data with a high bandwidth over long transmission paths. In particular, the optical waveguide of the optical plug connection element is used in non-destructive testing of a component using thermography or using a digital X-ray flat panel detector; in all cases, sensor data from the testing head used is streamed with a high bandwidth to an evaluation station.

Preferably, the change-over coupling comprises a centrepiece on the side facing the manipulation element, said centrepiece having an attachment element for attachment to a line of the manipulation element. Particularly preferably, the attachment element protrudes radially outwards from the centrepiece. The centrepiece thus allows a line to be attached to the change-over coupling in the radial direction. This is necessary for example for certain manipulation elements to allow the line to be routed away without impairing the mobility of the manipulation element.

According to a preferred embodiment, the change-over coupling, preferably at least the main body, in particular the main body and the centrepiece, comprises through-holes for connecting the change-over coupling, on the side facing the manipulation element, to an adapter plate, in order to simplify the connection of the change-over coupling to a standardised manipulation element.

According to a preferred embodiment, a supply of cables to the change-over coupling is arranged in the direction of the longitudinal axis of the change-over coupling. Alternatively, the supply of cables to the change-over coupling can be arranged orthogonally to the longitudinal axis of the change-over coupling.

Furthermore, a change-over coupling according to an above-described embodiment and a change-over adapter which is detachably connected to the change-over coupling are preferably parts of a change-over device which is used in particular in non-destructive testing of a component, in particular an aircraft component, preferably a fibre-reinforced plastic component, for example of a hydraulic housing, a flight-safety-critical wing component or control component, or an engine casing.

According to a preferred embodiment, a testing or processing system, in particular for the non-destructive testing of a component, preferably a fibre-reinforced plastic component, for example an aircraft component, comprises a manipulation element, in particular a robot arm, a change-over coupling according to one of the above-described embodiments, and a change-over adapter, which is detachably connected to the manipulation element via the change-over coupling.

BRIEF DESCRIPTION OF THE FIGURES

The invention is further explained below using a non-limiting exemplary embodiment shown in the drawings.

DETAILED DESCRIPTION

Figure 1:
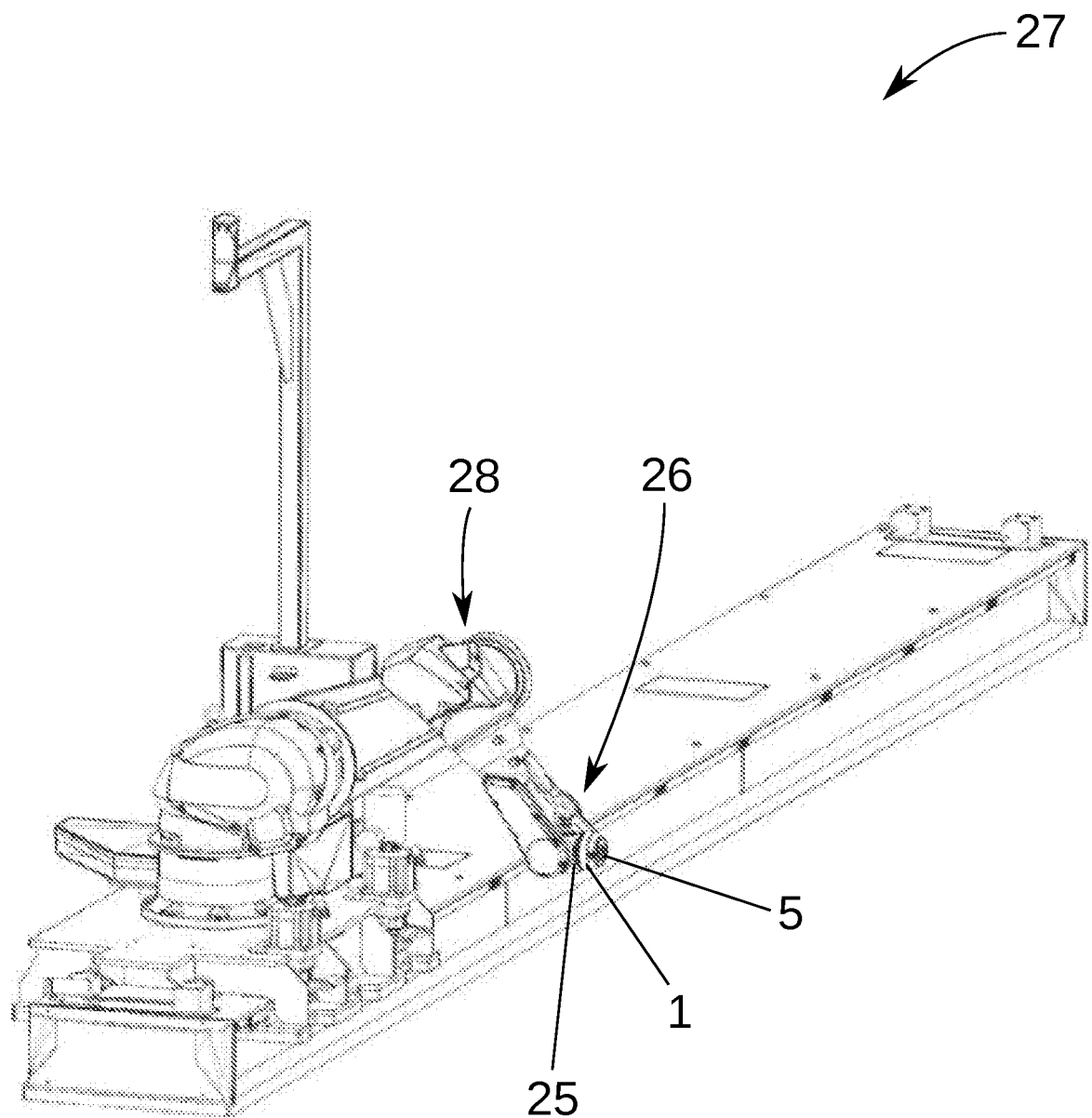
FIG. 1 shows a testing system according to the invention, which comprises a manipulation element and a multi-part change-over device.

FIG. 1 shows a testing system 27 according to the invention for the non-destructive testing of a fibre-reinforced plastic component. The testing system has a change-over device 26, an adapter plate 25, and a manipulation element 28, which is in the form of a robot arm. The adapter plate 25 is mounted on the manipulation element 28 on one side and detachably connected to the change-over device 26 on the other side.

Figure 2A:
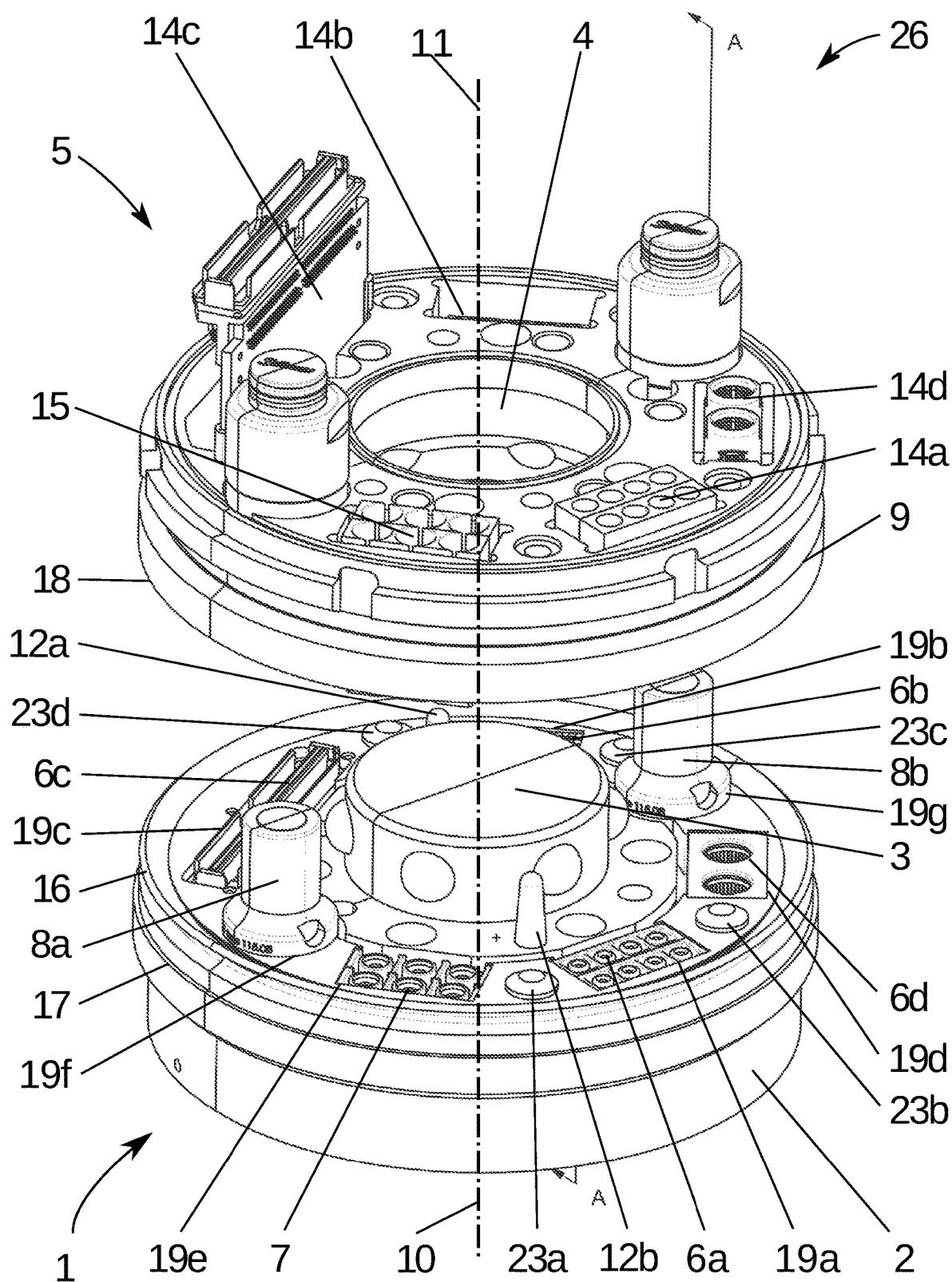
FIG. 2a shows an exploded diagram of the change-over device according to FIG. 1, which comprises a change-over coupling and a change-over adapter.

FIG. 2a shows the change-over device 26, which has a change-over coupling 1 and a change-over adapter 5. The change-over coupling 1 has a main body 2 and a clamping element 3 for bracing with a corresponding clamping element 4 on the change-over adapter 5. The clamping elements 3 and 4 cooperate in a known manner, and therefore only the components essential to the invention are explained below. In the embodiment shown, the clamping element 3 on the change-over coupling 1 has a clamping cylinder with clamping balls which can be braced with corresponding clamping receptacles in the clamping element 4 on the change-over adapter 5.

As can be seen in FIG. 2a, the change-over coupling 1 has, for example, four electrical plug connection elements 6a, 6b, 6c and 6d, one optical plug connection element 7, and two liquid-coupling elements 8a, 8b. When the change-over coupling 1 is connected to the change-over adapter 5, the liquid-coupling elements 8a, 8b are inserted into one another, a liquid-conducting connection between liquid lines being produced inside the liquid-coupling elements 8a, 8b.

As can also be seen in the drawing, the liquid-coupling elements 8a, 8b each protrude further in the axial direction of connection to the change-over adapter 5 than the electrical plug connection elements 6a, 6b, 6c and 6d, as a result of which the liquid-coupling elements 8a, 8b effect an alignment of the electrical plug connection elements 6a, 6b, 6c and 6d when the change-over adapter 5 is attached, as explained in detail below.

Figure 4:
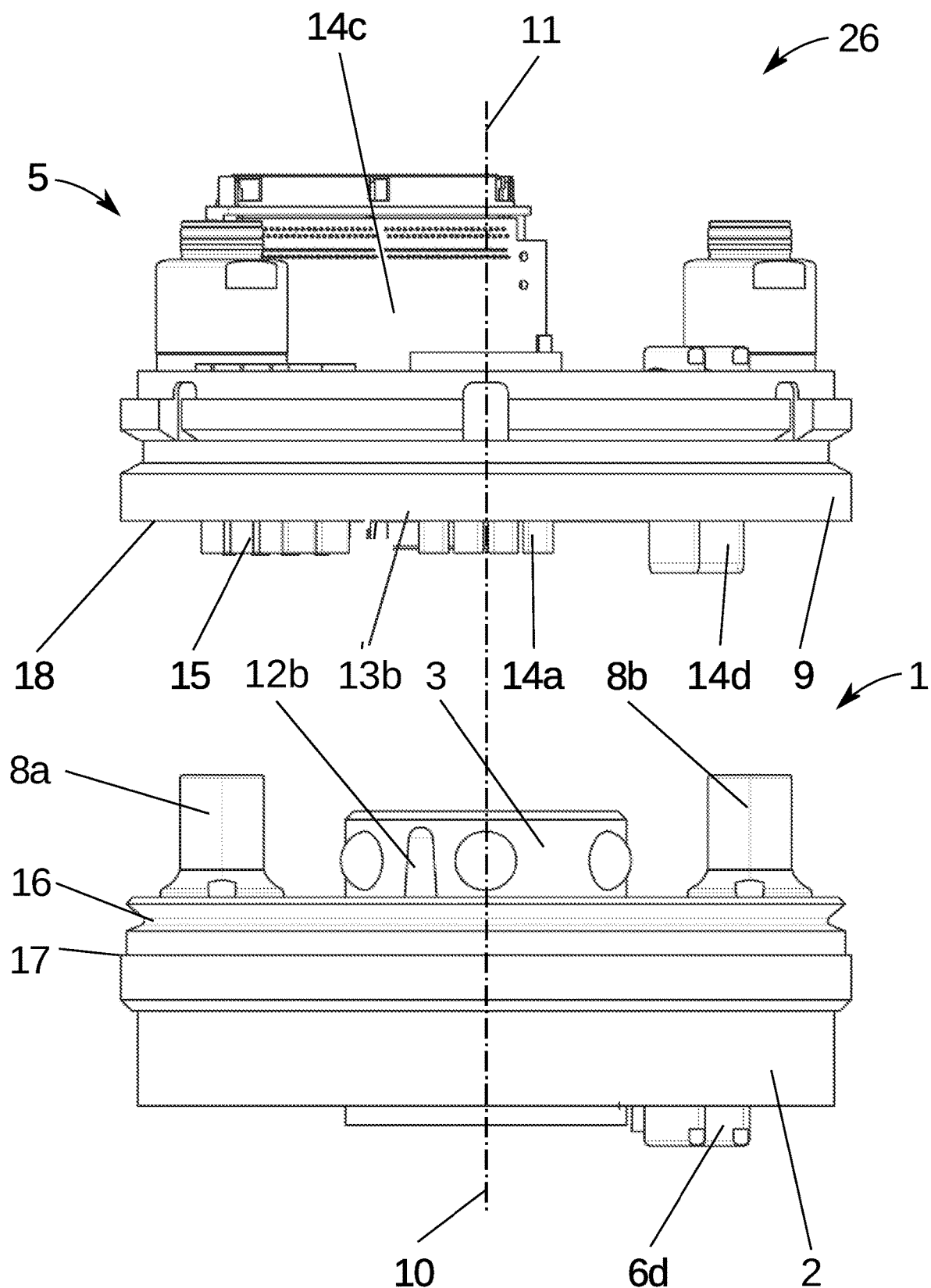
FIG. 4 shows a side view of the change-over device according to FIG. 2a in the decoupled state.
Figure 5:
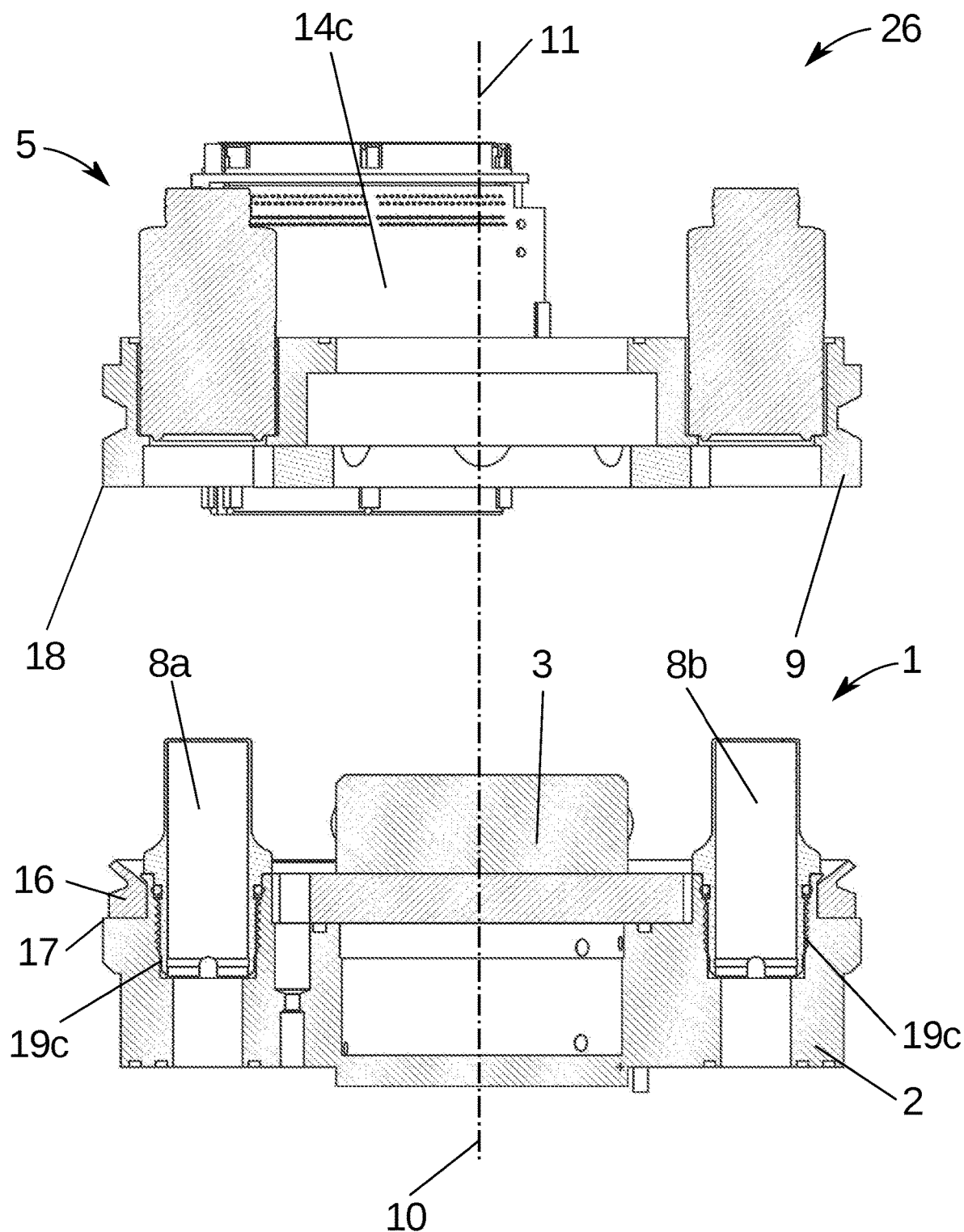
FIG. 5 shows a section through the change-over device in the decoupled state according to FIG. 4.

As can be seen in FIGS. 2a, 4 and 5, the change-over adapter 5 has a base body 9. The main body 2 of the change-over coupling 1 and the base body 9 of the change-over adapter 5 each have a cylindrical main shape. When the change-over coupling 1 is connected to the change-over adapter 5 using the clamping elements 3 and 4, the longitudinal axis 10 of the main body 2 and the longitudinal axis 11 of the base body 9 are congruent. The clamping elements 3 and 4 prevent the change-over adapter 5 shifting relative to the change-over coupling 1 in the axial and radial directions of the rotation axes 10 and 11, whereas twisting of the change-over adapter 5 about the longitudinal axis 10 is not prevented by the clamping elements 3 and 4. For this reason, the change-over coupling 1 in the embodiment shown has an anti-rotation element for connection to a corresponding anti-rotation element on the change-over adapter. In the embodiment shown, two connection pegs 12a and 12b which taper towards the connection to the change-over adapter 5 are provided as the anti-rotation element on the change-over coupling 1, and two mating peg receptacles are provided as the corresponding anti-rotation element on the change-over adapter 5. For example, as shown in FIG. 4, the connection peg 12b on the change-over coupling 1 mates with peg receptacle 13b on the change-over adapter 5.

In the embodiment shown, the liquid-coupling elements 8a and 8b extend parallel to the two tapered connection pegs 12a and 12b. Owing to the tapering of the connection pegs 12a and 12b, the electrical plug connection elements 6a, 6b, 6c and 6d and the optical plug connection element 7 are first coarsely aligned by the liquid-coupling elements 8a and 8b and then finely aligned by the connection pegs 12a and 12b, with four corresponding electrical plug connection elements 14a, 14b, 14c and 14d and a corresponding optical plug connection element 15 on the change-over adapter 5, before the change-over coupling 1 is connected to the change-over adapter 5. Furthermore, the liquid-coupling elements 8a and 8b have a larger radial distance from the centre axis of the clamping element 3 than the connection pegs 12a and 12b. As a result, the liquid-coupling elements 8a and 8b can absorb torques better than the connection pegs 12a and 12b when the change-over adapter 5 is twisted relative to the change-over coupling 1, and therefore said connection pegs can be made smaller.

In the embodiment shown, the change-over coupling 1 has a seal ring 16 for sealing connection of the change-over coupling 1 to the change-over adapter 5. The seal ring 16 has a V-shaped cross-section in the embodiment shown. The point of the "V" points inwards to allow a liquid from the environment to collect and then drip off the seal ring 16. As shown in FIG. 2a, the seal ring 16 extends in the circumferential direction around the outer edge 17 (in relation to the longitudinal axis of the change-over coupling 1) of the main body 2 of the change-over coupling 1 on the side of the change-over adapter 5. During coupling, an outer edge 17 of the seal ring 16 is pushed, on contact with the change-over adapter 5, towards an outer edge 18 of the change-over adapter 5 and thus drives off any moisture present towards the outer edge 18 of the change-over adapter 5.

Figure 6:
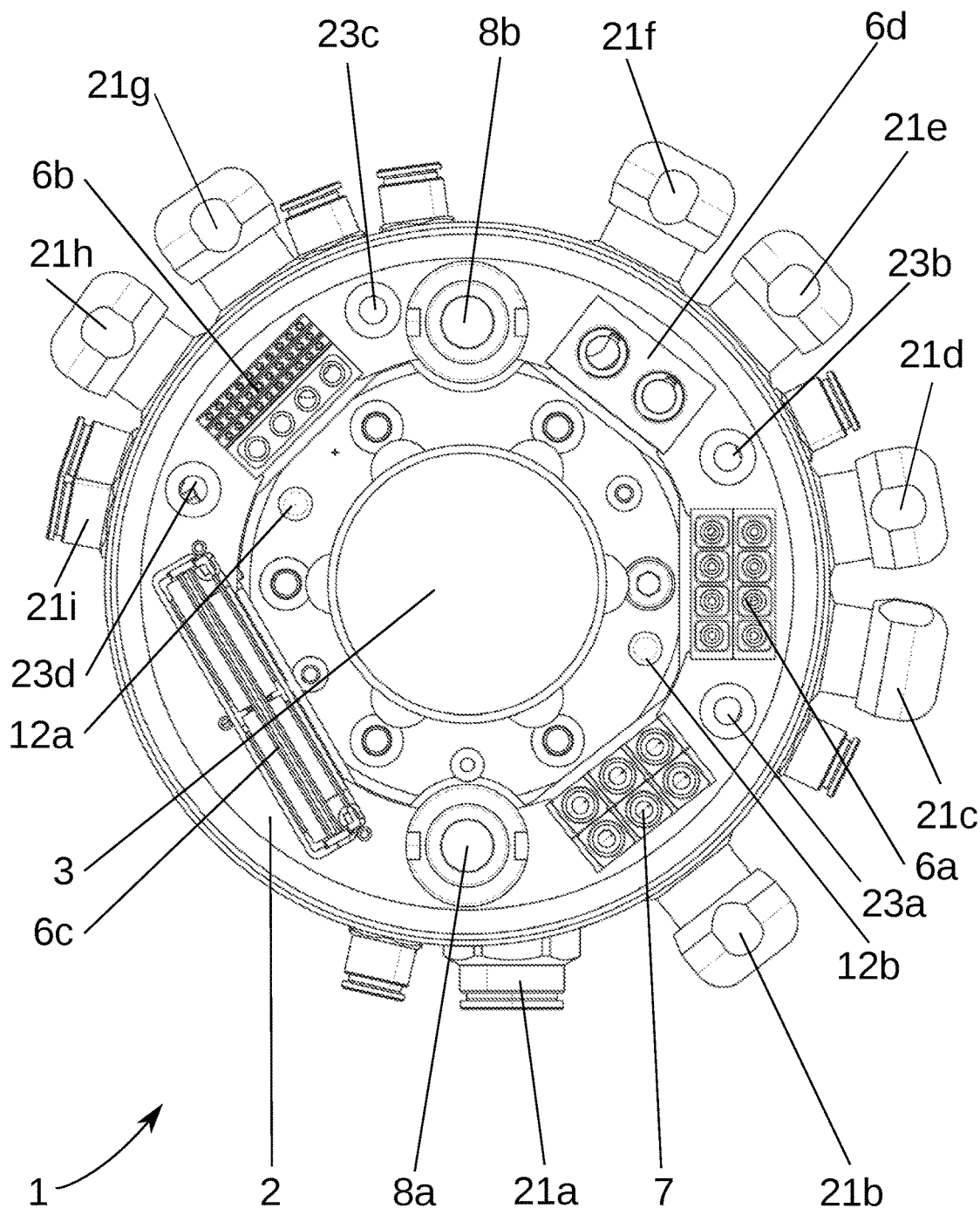
FIG. 6 shows a view from above of the change-over coupling, the centrepiece and the adapter plate of FIG. 2b.

As can be seen in FIGS. 2a and 6, the electrical plug connection elements 6a, 6b, 6c and 6d, the optical plug connection element 7, and the liquid-coupling elements 8a and 8b of the change-over coupling 1, as well as the electrical plug connection elements 14a, 14b, 14c and 14d and the optical plug connection element 15 of the change-over adapter 5 are arranged inside the seal ring 16. As a result, the corresponding electrical plug connection elements and liquid-coupling elements are protected from the ingress of liquids and gases from the environment.

To fasten the electrical plug connection elements 6a, 6b, 6c and 6d, the optical plug connection element 7, and the liquid-coupling elements 8a and 8b exchangeably to the change-over coupling 1, the main body 2 of the change-over coupling 1 has cut-outs 19a, 19b, 19c, 19d, 19e, 19f and 19g in the main body 2 for the detachable arrangement of said elements.

In the embodiment shown, the electrical plug connection element 6a has high-voltage contacts and high-current contacts, which are connected to high-voltage contacts and high-current contacts of the corresponding electrical plug connection element 14a of the change-over adapter 5 when the change-over coupling 1 is braced to the change-over adapter 5. The high-voltage contacts and high-current contacts are used, for example, to drive servomotors at a DC link voltage of 680 V on a motorised change-over adapter.

In the embodiment shown, the electrical plug connection element 6b has high-frequency contacts, which are connected to high-frequency contacts of the corresponding electrical plug connection element 14b of the change-over adapter 5 when the change-over coupling 1 is braced to the change-over adapter 5. The high-frequency contacts, which are in the form of coaxial high-frequency contacts in the embodiment shown, are used for example in the non-destructive testing of a component using ultrasound. In this case, a tool mounted on the change-over adapter 5 is supplied with high-frequency pulses via the high-frequency contacts in order to generate ultrasonic waves.

In the embodiment shown, further high-frequency contacts are present in the electrical plug connection element 6c and are connected to high-frequency contacts of the corresponding electrical plug connection element 14c of the change-over adapter 5 when the change-over coupling 1 is braced to the change-over adapter 5. The high-frequency contacts of the electrical plug connection element 6c, which are in the form of high-frequency contacts with a high packing density in the embodiment shown, are used for example to test a component non-destructively using ultrasound with beam steering. In this case, high-frequency pulses which are staggered from contact to contact are provided, via the high-frequency contacts of the corresponding electrical plug connection elements 6c and 14c, to a tool which is equipped with an ultrasonic emitter array and is mounted on the change-over adapter 5. The high-frequency contacts with high packing density are mounted resiliently for additional protection from damage, which can be caused by impacts, for example.

In the embodiment shown, the electrical plug connection element 6d is a high-pin-count linear encoder interface (position encoder interface), which is connected to the corresponding electrical plug connection element 14d of the change-over adapter 5, likewise in the form of a high-pin-count linear encoder interface, when the change-over coupling 1 is braced to the change-over adapter 5. Signals are exchanged thereby between the tool which is mounted on the change-over adapter 5 and a control element which is connected to the change-over coupling 1.

In the embodiment shown, the electrical plug connection element 6b has, in addition to the high-frequency contacts, contacts for transmitting supply voltages and contacts for data transmission, the contacts on the change-over coupling 1 being connected to corresponding contacts of the corresponding electrical plug connection element 14b of the change-over adapter 5 when the change-over coupling 1 is braced to the change-over adapter 5. The contacts for transmitting supply voltages are used, for example, to connect electrical lines, which lead to a tool on the change-over adapter 5 for the non-destructive testing of a component, to electrical lines, which lead to a voltage source.

In the embodiment shown, the electrical plug connection element 6b also has contacts for data transmission of the tool identifier ("ToolID") and of analogue and digital sensor information. In this case, the ToolID, which is a unique identifier of a tool mounted on the change-over adapter 5, and analogue and digital information from a sensor fastened to the tool are forwarded via the contacts for data transmission of the electrical plug connection element 6b, for example to a data-processing device connected to the change-over coupling 1.

In the embodiment shown, the optical plug connection element 7 has optical waveguides, which are connected to optical waveguides of the corresponding optical plug connection element 15 of the change-over adapter 5 when the change-over coupling 1 is braced to the change-over adapter 5. The optical waveguides are used for example in the non-destructive testing of a component using thermography or digital radiography. The optical waveguides are used as an interference-free transmission channel with a very high bandwidth.

Figure 2B:
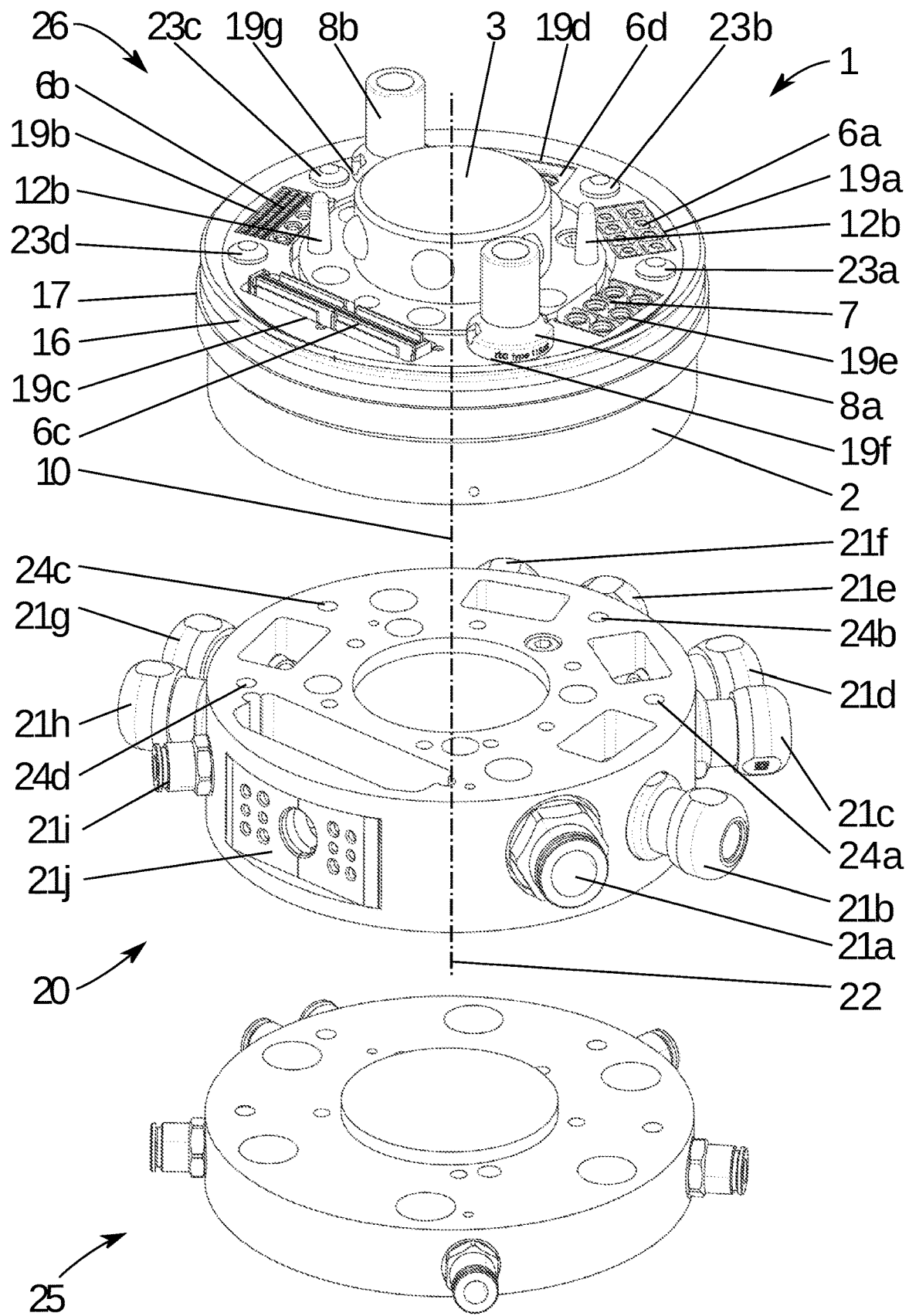
FIG. 2b shows an exploded diagram of the change-over coupling according to FIGS. 1 and 2, including a centrepiece and an adapter plate.
Figure 3:
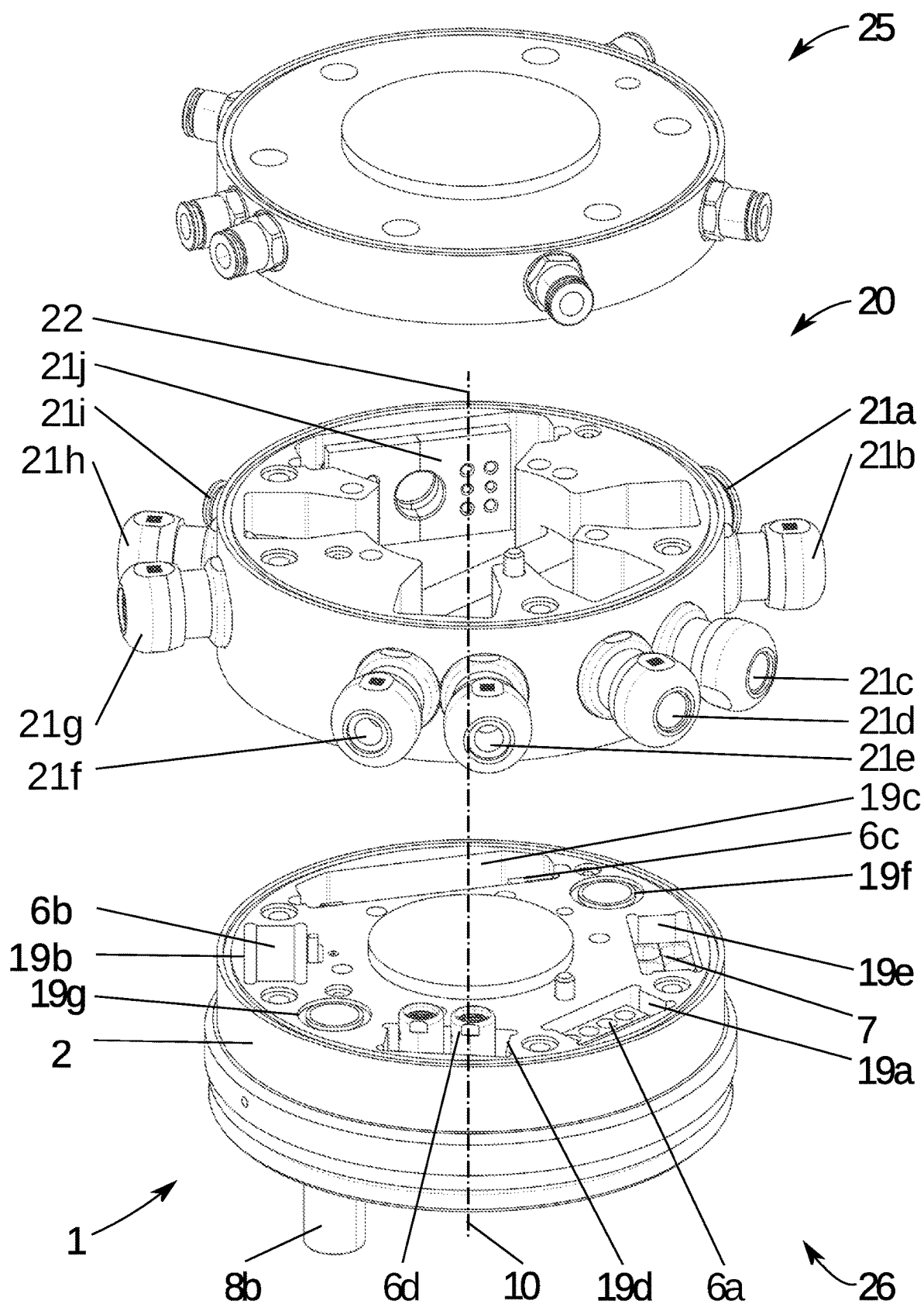
FIG. 3 shows a second exploded diagram of the change-over coupling, the centrepiece and the adapter plate of FIG. 2b.

As can be seen in FIGS. 2b and 3, the change-over coupling 1 in the embodiment shown has a centrepiece 20 on the side facing the manipulation element. The centrepiece 20 has attachment elements 21a, 21b, 21c, 21d, 21e, 21f, 21g, 21h, 21i, and 21j. In the embodiment shown, the centrepiece has a cylindrical main shape, and the longitudinal axis 22 of the centrepiece 20 and the rotation axis 10 of the main body 2 are congruent. The attachment element 21j is used for the sealed feeding-through of high-frequency single contact cables and for the sealed feeding-through of a micro coaxial cable for supplying the high-frequency contacts with a high packing density of the electrical plug connection element 6c, which are soldered to a rectangular circuit board and are connected via same to the micro coaxial cable. The rectangular circuit board and the micro coaxial cable are delivered preassembled and therefore have to be installed and replaceable together. Sealing off from the environment is carried out by crimping a seal block by means of the attachment element 21j, the high-frequency single contact cables and the micro coaxial cable being fed through the seal block. The crimping results in sealing of the cable on the one hand and sealing with respect to the housing on the other hand. If a higher-quality seal is necessary, the centrepiece 20 is shaped such that the centrepiece 20 can additionally be filled in an internal cavity with a sealing compound. The attachment elements 21a to 21j are arranged on the centrepiece 20 outwards in the radial direction of the rotation axis 22 in order to allow a sealed attachment of lines to the change-over coupling 1 in the radial direction, the lines being relieved of stresses resulting from tensile forces. This embodiment is provided when the manipulation element is in the form of a multi-axially movable robot arm, to allow the lines to be routed away. With a different design of the manipulation element, for example with what are known as linear kinematics, the centrepiece 20 can be omitted.

In the embodiment shown, the main body 2 of the change-over coupling 1 has pneumatic transfer ducts 23a, 23b, 23c and 23d, and the centrepiece 20 of the change-over coupling 1 has pneumatic transfer ducts 24a, 24b, 24c and 24d. The adapter plate 25 is screw-fastened to a machine flange, which is not shown in the embodiment shown. The machine flange is prior art, and therefore more detailed explanations are not necessary. The screw-fastening of the change-over coupling 1 to the centrepiece 20, to the adapter plate 25 and to the machine flange is arranged such that screw-fastening and assembly start from the machine flange. That is, if the machine flange is a robot flange, the adapter plate 25 is screw-fastened first, then the centrepiece 20 and then the change-over coupling 1. The adapter 25, the centrepiece 20, the change-over coupling 1 and also the screw-fastenings are designed such that they seal outwards into the environment and therefore there is no ingress of moisture from outside. The sealing off from the environment also applies to different change-over adapters.

Figure 7:
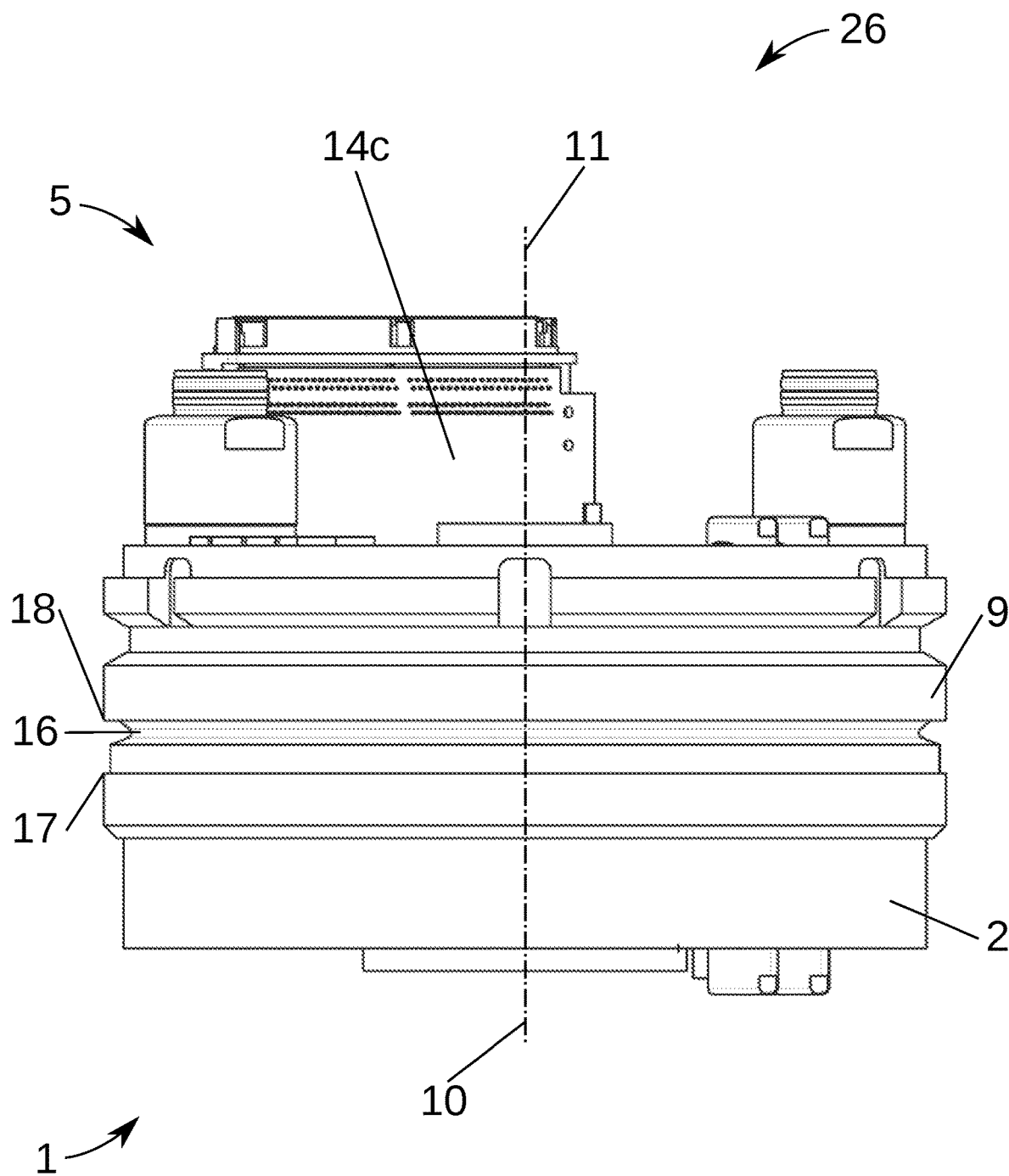
FIG. 7 shows a side view of the change-over device according to FIG. 2a in the coupled and braced state.

FIG. 7 shows the change-over device 26, in which the change-over coupling 1 and the change-over adapter 5 are connected detachably to one another. In this case, the change-over coupling 1 is braced to the change-over adapter 5 by bracing the clamping element 3 of the change-over coupling 1 to the clamping element 4 of the change-over adapter 5. In the embodiment shown, the change-over adapter 5 of the change-over device 26 allows different tools to be mounted for non-destructive testing of a fibre-reinforced plastic component.

Figure 8:
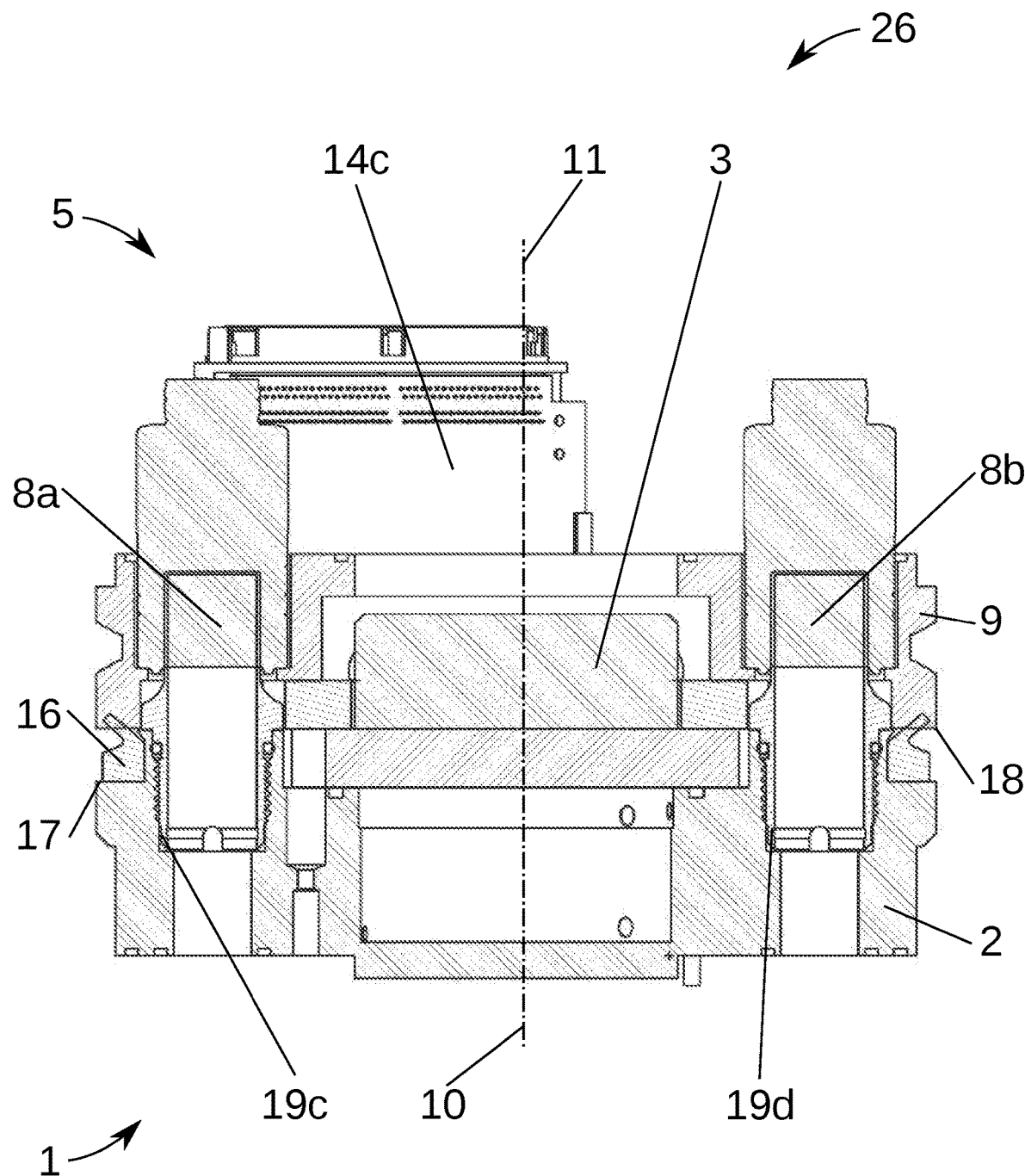
FIG. 8 shows a section through the change-over device in the coupled and braced state according to FIG. 7.

As can be seen in FIG. 8, the liquid-coupling elements 8a and 8b protrude further towards the change-over adapter 5 and thus prevent the corresponding electrical or optical plug connection elements being placed onto the electrical or optical plug connection elements of the change-over coupling 1 in a twisted state.

Figure 9:
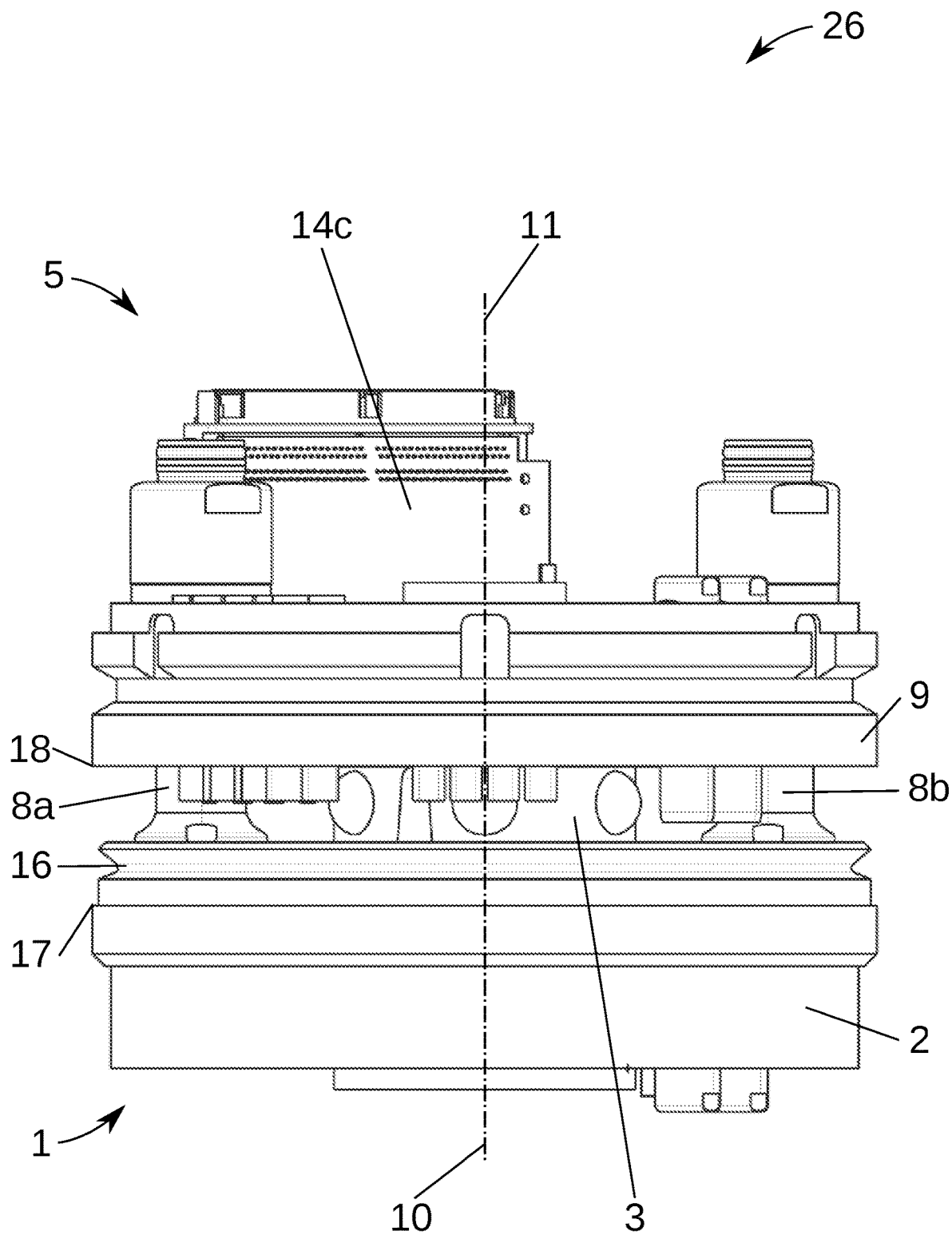
FIG. 9 shows a side view of the change-over device according to FIG. 2a with the change-over coupling and the change-over adapter in the aligned state.
Figure 10:
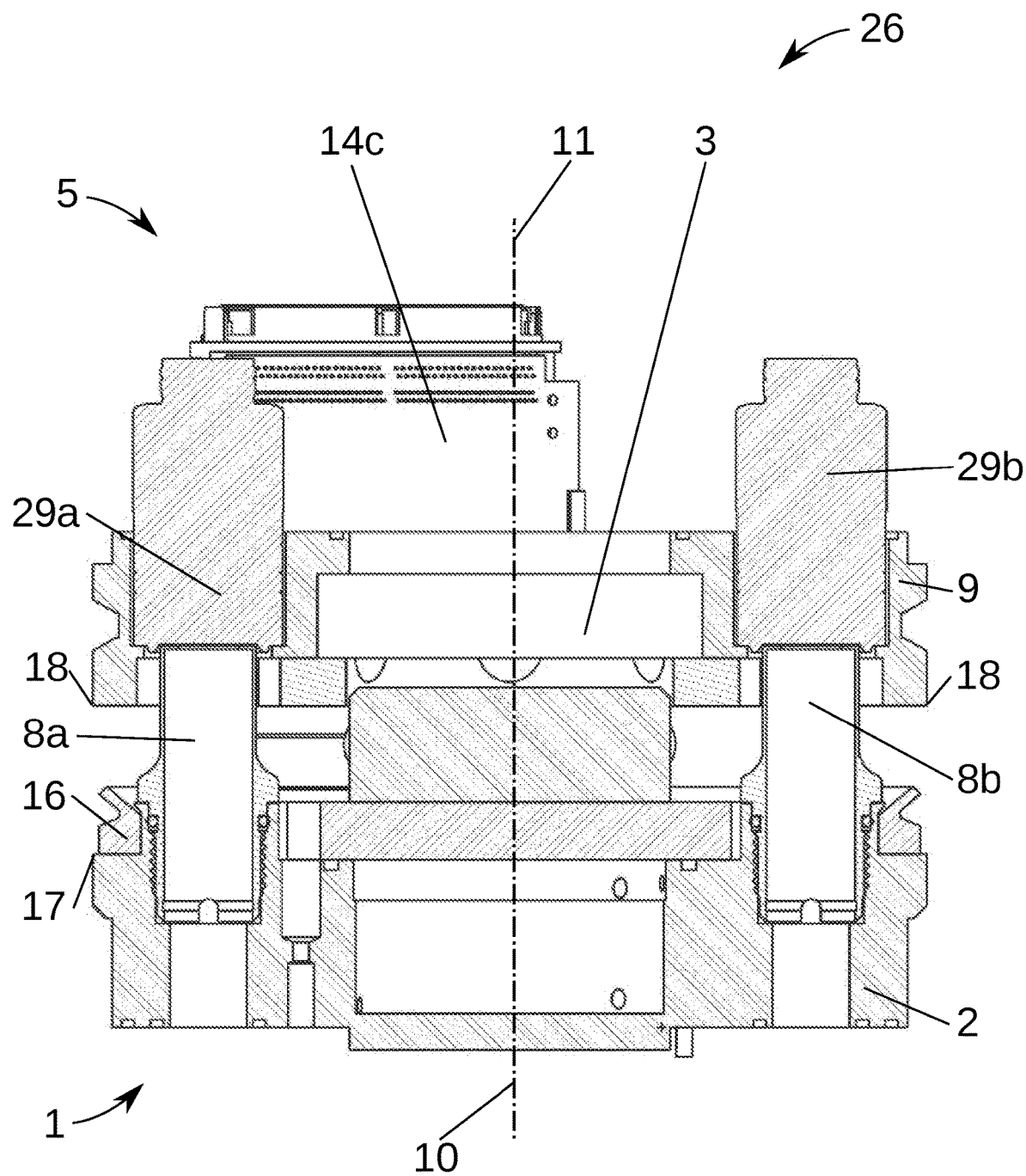
FIG. 10 shows a section through the change-over device according to FIG. 9.

FIGS. 9 and 10 show the change-over coupling 1 and the change-over adapter 5 of the change-over device 26 during the connection process before the braced state is achieved. In this case, the change-over coupling 1 and the change-over adapter 5 are aligned with one another by the connection of the liquid-coupling elements 8a and 8b of the change-over coupling 1 to the corresponding liquid-elements 29a and 29b of the change-over adapter 5.

Figure 11:
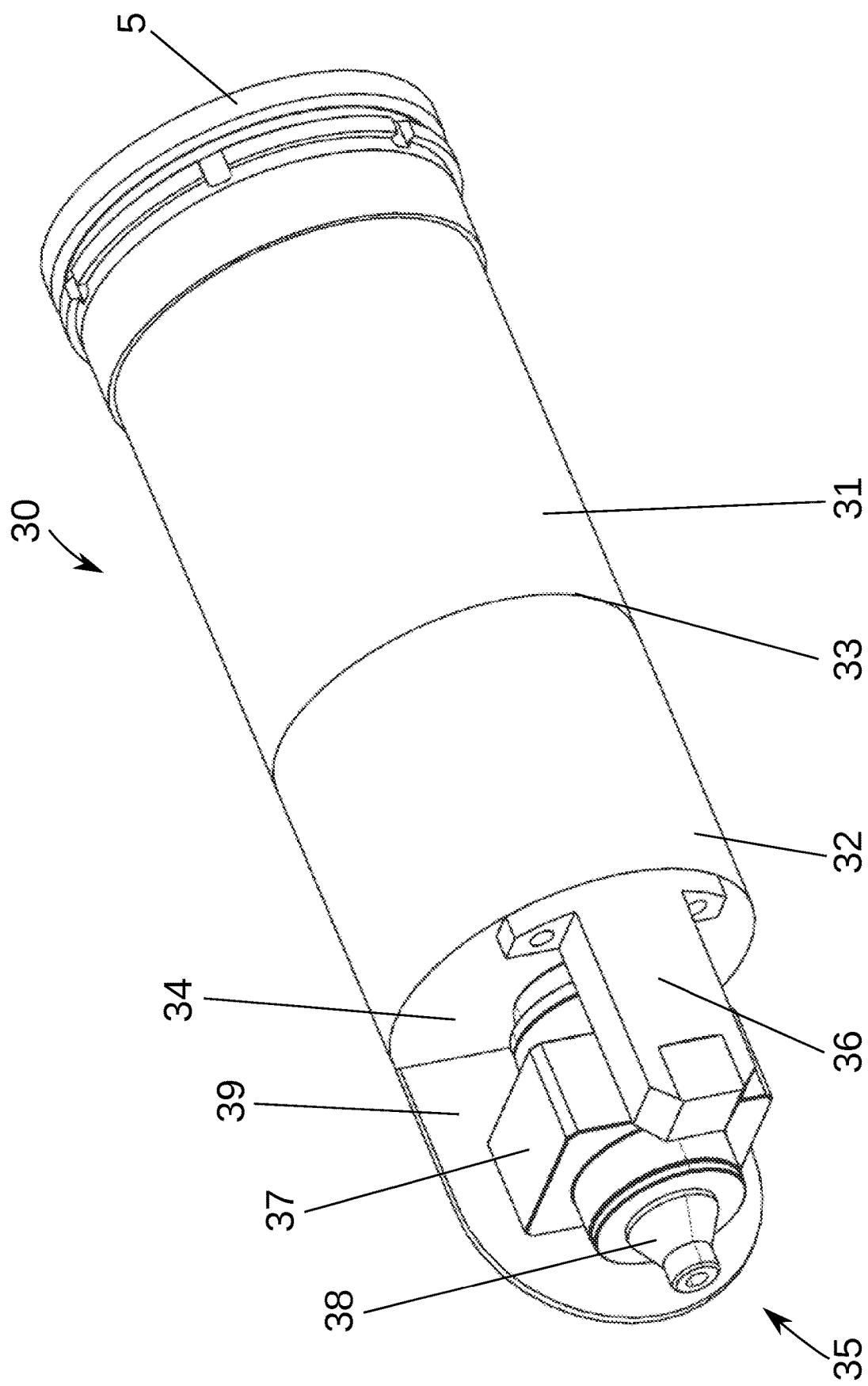
FIG. 11 shows the change-over adapter according to FIG. 2a and a tool for the non-destructive testing of a fibre-reinforced plastic component.

FIG. 11 shows the change-over adapter 5 of the change-over device 26 according to FIG. 2a, on which a tool 30 for the non-destructive testing of a fibre-reinforced plastic component is mounted. The tool 30 has a cylindrical motor housing 31 which is coaxially adjacent to the change-over adapter 5 and is connected to the change-over adapter 5 detachably and for conjoint rotation therewith. In the motor housing 31 there is a servomotor, which is not shown in FIG. 11. On one side of the motor housing 31, opposite the change-over adapter 5 when the tool 30 is mounted, the tool 30 has a cylindrical gear housing 32, which is arranged coaxially with the cylindrical motor housing 31. In the gear housing 32 there is a gearing mechanism, which is connected to the servomotor and converts torques and/or rotation speeds generated by the servomotor. Between the motor housing 31 and the gear housing 32, the tool 30 has a mechanical collision protection means 33, which allows the gear housing 32 to pivot away from the motor housing 31 in the event of external mechanical effects on the gear housing 32. On a side 34 of the gear housing 32 opposite the motor housing 31 there is a tool head 35, which is mounted rotatably on a holder 36 fastened to the gear housing 32.

With the aid of the servomotor, the tool head 35 can be rotated relative to the holder 36 and thus relative to the change-over device 26. The tool head 35 has a testing head 37 and a water nozzle 38. To protect the tool head 35 from mechanical effects, a protective plate 39 is fastened to the side 34 opposite the motor housing 31 and is arranged on a side of the tool head 35 opposite the holder 36.

In the embodiment shown in FIG. 11, the tool 30 has, on a side bearing against the change-over adapter 5, an electrical plug connection element with four high-voltage and high-current contacts for driving the servomotor, which are connected to high-voltage and high-current contacts of the corresponding electrical plug connection element 14a of the change-over adapter 5 when the tool 30 is mounted with the change-over adapter 5. Furthermore, the tool 30 has, on the side bearing against the change-over adapter 5, an electrical plug connection element with two contacts for a motor brake of the servomotor, said electrical plug connection element being connected to a corresponding plug connection element of the change-over adapter 5 when the tool 30 is mounted with the change-over adapter 5. In addition, on the side of the tool 30 bearing against the change-over adapter 5, there is an electrical plug connection element with a shielded 14-pin encoder interface for an external measurement system, a 9-pin encoder interface for a motor measurement system of the servomotor, and six data lines for a ToolID; the electrical plug connection element can be connected to the corresponding electrical plug connection element 14b of the change-over adapter 5, to identify the mounted tool 30 unambiguously and to forward measured data from the external measurement system and from the motor measurement system.

In the embodiment shown in FIG. 11, the tool 30 has, on the side bearing against the change-over adapter 5, two liquid valves, which are connected to the liquid elements 29a and 29b of the change-over adapter 5 when the tool 30 is mounted with the change-over adapter 5. Liquid lines lead from the two liquid valves to the water nozzle 38 to supply the latter with water. Furthermore, the tool 30 has, on the side of the change-over adapter 5, three coupling elements for air, which are each connected to a corresponding coupling element for air on the change-over adapter 5. A first coupling element for air of the tool 30 supplies the tool 30 with sealing air to seal it off from the environment. A second coupling element for air is used for monitoring the mechanical collision protection means 33 by supplying the mechanical collision protection means 33 with sealing air. When the gear housing 32 pivots away from the motor housing 31, the movement of the gear housing 32 relative to the motor housing 31 is detected by means of the escape of the sealing air. A third coupling element supplies the tool 30 with air for blowing off water droplets. In addition, the tool 30 has, on the side bearing against the change-over adapter 5, an electrical plug connection element with two coaxial high-frequency contacts, which are connected to high-frequency contacts of the corresponding electrical plug connection element 14c of the change-over adapter 5 when the tool 30 is mounted with the change-over adapter 5.

Via the two coaxial high-frequency contacts of the tool 30, the testing head 37 is supplied with high-frequency pulses for generating ultrasonic waves.

The invention claimed is:

1. A change-over device in particular for the non-destructive testing of a component, preferably a fibre-reinforced plastic component, comprising:
    a change-over coupling for connecting a manipulation element, in particular a robot arm, to a change-over adapter, and
    the change-over adapter, which is detachably connected to the change-over coupling,
    the change-over coupling comprising:
        a clamping element for bracing with a corresponding clamping element on the change-over adapter,
        at least one electrical and/or optical plug connection element for connection to at least one corresponding electrical and/or optical plug connection element on the change-over adapter,
    wherein
        the change-over coupling comprises two water-coupling elements for connection to two corresponding water-coupling element on the change-over adapter,
        the water-coupling elements protrude further towards the connection to the change-over adapter than the at least one electrical and/or optical plug connection element, such that the at least one electrical and/or optical plug connection element and the at least one corresponding electrical and/or optical plug connection element on the change-over adapter are aligned with one another before they meet as a result of the connection of the water-coupling elements to the corresponding water-coupling elements on the change-over adapter, and
        the change-over coupling comprises a seal ring for sealing connection to the change-over adapter, wherein the seal ring preferably comprises a V-shaped cross-section.

2. The change-over device according to claim 1, wherein change-over coupling comprises an anti-rotation element for connection to a corresponding anti-rotation element on the change-over adapter, wherein the anti-rotation element is preferably provided as a connection peg, which tapers towards the connection to the change-over adapter, and the corresponding anti-rotation element on the change-over adapter is provided as a peg receptacle.

3. The change-over device according to claim 2, wherein the water-coupling elements comprise a larger radial distance from the clamping element than the anti-rotation element.

4. The change-over device according to claim 1, wherein the seal ring is arranged on an outer edge of a preferably cylindrical main body of the change-over coupling.

5. The change-over device according to claim 1, wherein the electrical and/or optical plug connection element and the water-coupling elements are each arranged inside the seal ring in the radial direction.

6. The change-over device according to claim 1, wherein the change-over coupling comprises a first cut-out for the detachable arrangement of the electrical and/or optical plug connection element and/or a second cut-out for the detachable arrangement of the water-coupling elements.

7. The change-over device according to claim 1, wherein at least one electrical plug connection element comprises high-voltage contacts or high-current contacts.

8. The change-over device according to claim 1, wherein at least one electrical plug connection element comprises high-frequency contacts.

9. The change-over device according to claim 1, wherein at least one electrical plug connection element has a high pin count.

10. The change-over device according to claim 1, wherein at least one electrical plug connection element comprises contacts for transmitting a supply voltage from the manipulation element to the change-over adapter.

11. The change-over device according to claim 1, wherein at least one electrical plug connection element comprises contacts for data transmission, in particular for transmitting a tool identifier and/or analogue and/or digital sensor data, from the change-over adapter to the manipulation element.

12. The change-over device according to claim 1, wherein at least one optical plug connection element comprises an optical waveguide.

13. The change-over device according to claim 1, further comprising a centrepiece on the side facing the manipulation element, having an attachment element for the attachment of a line to the manipulation element.

14. The change-over the according to claim 13, wherein the attachment element stands radially outwards from the centrepiece.

15. A testing or processing system, in particular for the non-destructive testing of a component, preferably a fibre-reinforced plastic component, comprising:
a manipulation element, in particular a robot arm;
a change-over device, the change-over device comprising:
a change-over coupling for connecting the manipulation element to a change-over adapter, and
the change-over adapter, which is detachably connected to the change-over coupling,
the change-over coupling comprising:
a clamping element for bracing with a corresponding clamping element on the change-over adapter,
at least one electrical and/or optical plug connection element for connection to at least one corresponding electrical and/or optical plug connection element on the change-over adapter,
wherein
the change-over coupling comprises two water-coupling elements for connection to two corresponding water-coupling element on the change-over adapter,
the water-coupling elements protrude further towards the connection to the change-over adapter than the at least one electrical and/or optical plug connection element, such that the at least one electrical and/or optical plug connection element and the at least one corresponding electrical and/or optical plug connection element on the change-over adapter are aligned with one another before they meet as a result of the connection of the water-coupling elements to the corresponding water-coupling elements on the change-over adapter, and
the change-over coupling comprises a seal ring for sealing connection to the change-over adapter, wherein the seal ring comprises a V-shaped cross-section.

* * * * *